(12) United States Patent
Duff (10) Patent No.: US 8,848,521 B1
(45) Date of Patent: Sep. 30, 2014

(54) CHANNEL ALLOCATION AND DEVICE CONFIGURATION

(75) Inventor: John F. Duff, Breezy Point, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 332 days.

(21) Appl. No.: 13/335,452

(22) Filed: Dec. 22, 2011

(51) Int. Cl.
G05B 11/01 (2006.01)

(52) U.S. Cl.
USPC .......................... 370/229; 370/230; 370/468

(58) Field of Classification Search
CPC ....................................................... H04J 3/1682
USPC .......................................... 370/229, 230, 468
See application file for complete search history.

(56) References Cited

U.S. PATENT DOCUMENTS

| | | | |
|---|---|---|---|
| 5,581,229 A | 12/1996 | Hunt | |
| 6,154,488 A | 11/2000 | Hunt | |
| 6,177,884 B1 | 1/2001 | Hunt et al. | |
| 6,998,963 B2 | 2/2006 | Flen et al. | |
| 7,102,490 B2 | 9/2006 | Flen et al. | |
| 7,145,438 B2 | 12/2006 | Flen et al. | |
| 7,180,412 B2 | 2/2007 | Bonicatto et al. | |
| 7,184,861 B2 | 2/2007 | Petite | |
| 7,209,840 B2 | 4/2007 | Petite et al. | |
| 7,224,740 B2 | 5/2007 | Hunt | |
| 7,236,765 B2 | 6/2007 | Bonicatto et al. | |
| 7,346,463 B2 | 3/2008 | Petite et al. | |
| 7,432,824 B2 | 10/2008 | Flen et al. | |
| 7,443,313 B2 | 10/2008 | Davis et al. | |
| 7,468,661 B2 | 12/2008 | Petite et al. | |
| 7,706,320 B2 | 4/2010 | Davis et al. | |
| 7,738,999 B2 | 6/2010 | Petite | |
| 7,742,393 B2 | 6/2010 | Bonicatto et al. | |
| 7,774,530 B2 | 8/2010 | Haug et al. | |
| 7,791,468 B2 | 9/2010 | Bonicatto et al. | |
| 7,877,218 B2 | 1/2011 | Bonicatto et al. | |
| 7,978,059 B2 | 7/2011 | Petite et al. | |
| 8,144,816 B2 | 3/2012 | Bonicatto et al. | |
| 8,144,820 B2 | 3/2012 | Bonicatto | |
| 8,194,789 B2 | 6/2012 | Wolter et al. | |
| 8,213,301 B2* | 7/2012 | Park et al. | 370/229 |
| 8,238,263 B2 | 8/2012 | Kohout et al. | |
| 2005/0195968 A1* | 9/2005 | Park et al. | 379/406.08 |
| 2005/0281226 A1* | 12/2005 | Lee et al. | 370/329 |
| 2008/0304595 A1 | 12/2008 | Haug et al. | |
| 2009/0136833 A1* | 5/2009 | Lee et al. | 429/122 |
| 2009/0316766 A1* | 12/2009 | Korobkov et al. | 375/227 |
| 2009/0323575 A1* | 12/2009 | Li et al. | 370/312 |
| 2010/0054314 A1* | 3/2010 | Korobkov et al. | 375/222 |
| 2011/0029347 A1* | 2/2011 | Kozat et al. | 705/8 |

(Continued)

*Primary Examiner* — John Blanton
*Assistant Examiner* — Jay P Patel
(74) *Attorney, Agent, or Firm* — Crawford Maunu PLLC (57) ABSTRACT

One or more embodiments provide a method for assigning communication channels to endpoint devices. Transmission quality data is collected at one or more collectors for a plurality of sub-channels. The transmission quality data is transmitted from the collectors to a command center. At the command center, unused ones of the plurality of sub-channels are organized into communication channels based on the transmission quality data. Each communication channel has the same number of contiguous sub-channels that includes at least two sub-channels. One or more endpoint devices are assigned a respective one of the communications channels. A channel reconfiguration command is transmitted to at least one of the one or more collectors. In response to the reconfiguration command, collector(s) transmit data over the power distribution lines to configure at least one of the one or more endpoint devices to use the respective assigned communication channel.

22 Claims, 6 Drawing Sheets

(56) References Cited

U.S. PATENT DOCUMENTS

| | | | |
|---|---|---|---|
| 2011/0121952 A1 | 5/2011 | Bonicatto et al. | |
| 2011/0176445 A1* | 7/2011 | Chen | 370/252 |
| 2011/0176598 A1 | 7/2011 | Kohout et al. | |
| 2011/0188442 A1* | 8/2011 | Nakamura et al. | 370/315 |
| 2011/0188444 A1* | 8/2011 | Borleske et al. | 370/315 |
| 2011/0188445 A1* | 8/2011 | Borleske et al. | 370/315 |
| 2011/0188452 A1* | 8/2011 | Borleske et al. | 370/328 |
| 2011/0218686 A1 | 9/2011 | McHann, Jr. et al. | |
| 2011/0249678 A1 | 10/2011 | Bonicatto et al. | |
| 2012/0057592 A1* | 3/2012 | Zeppetelle et al. | 370/390 |
| 2012/0076212 A1 | 3/2012 | Zeppetelle et al. | |
| 2012/0084559 A1 | 4/2012 | Bonicatto | |
| 2012/0106664 A1 | 5/2012 | Bonicatto et al. | |
| 2012/0126790 A1* | 5/2012 | Sobotka et al. | 324/119 |
| 2012/0126994 A1* | 5/2012 | Sobotka et al. | 340/870.02 |
| 2012/0126995 A1* | 5/2012 | Sobotka et al. | 340/870.03 |
| 2012/0226920 A1* | 9/2012 | Strumpf | 713/300 |

* cited by examiner

CHANNEL ALLOCATION AND DEVICE CONFIGURATION

BACKGROUND

Service providers utilize distributed networks to provide services to customers over large geographic areas. For example, power companies use power distribution lines to carry power from one or more generating stations (power plants) to residential and commercial customer sites alike. The generating stations use alternating current (AC) to transmit power over long distances via the power distribution lines. Long-distance transmission can be accomplished using a relatively high voltage. Substations located near the customer sites provide a step-down from the high voltage to a lower voltage (e.g., using transformers). Power distribution lines carry this lower-voltage AC from the substations to the endpoint devices customer sites.

Communications providers may utilize a distributed communications network to provide communications services to customers. Similarly, power companies utilize a network of power lines, meters, and other network elements to provide power to customers throughout a geographic region and to receive data from the customer locations (e.g., including, but not limited to, data representing metered utility usage). A system can provide these reporting functions using a set of data-collecting devices (collectors) that are designed to communicate with nearby endpoint devices. However, data communication between a command center, collectors, and many thousands of endpoint devices over power distribution lines can be a particularly challenging issue. The sheer number of endpoint devices contributes to a host of issues including, but not limited to configuration, synchronization, communication bandwidth, and cost concerns such as power efficiency of the devices. Transmission quality and channel allocation may particularly be a concern for such a system.

SUMMARY

The present disclosure is directed to systems and methods for use with devices that communicate over power distribution lines that are subject to varying impedances. These and other aspects of the present disclosure are exemplified in a number of illustrated implementations and applications, some of which are shown in the figures and characterized in the claims section that follows.

Locating and configuring many thousands of deployed endpoint devices for data communications over power distribution lines can be a particularly challenging issue. The sheer number of endpoint devices contributes to a host of issues including allocation and assignment of channels based on the condition of channels for different endpoints, at different locations in the power distribution network. These and other issues can be appreciated in connection with one or more of the embodiments discussed herein.

Example embodiments of the instant disclosure include various methods and apparatuses. Consistent with the instant disclosure, certain embodiments are directed towards a method useful for assigning channels for communication between endpoint devices and collectors. The communications between these endpoint devices and collector devices occurs over power distribution lines (carrying power using alternating current (AC)). In this method for assigning communication channels, transmission quality data is collected at one or more collectors for a plurality of sub-channels. The transmission quality data is transmitted from the collectors to a command center. At the command center, unused ones of the plurality of sub-channels are organized into communication channels based on the transmission quality data. Each communication channel has the same number of contiguous sub-channels that includes at least two sub-channels. One or more endpoint devices are assigned a respective one of the communications channels. A channel reconfiguration command is transmitted to at least one of the one or more collectors. In response to the reconfiguration command, collector(s) transmit data over the power distribution lines to configure at least one of the one or more endpoint devices to use the respective assigned communication channel.

Embodiments of the present disclosure are also directed towards a method for monitoring communication channels used for communication between endpoint devices and one or more collectors over power distribution lines carrying alternating current (AC) power distribution lines communication network. In this method, a plurality of sub-channels is monitored on the power distribution lines at a collector. A quantized transmission quality value is determined for each of the plurality of sub-channels. The plurality of sub-channels is partitioned into groups of contiguous sub-channels. Transmission quality values of each group are formatted into a respective data block having only one address associated with the corresponding sub-channels. The data blocks are transmitted to a command center for analysis.

In certain embodiments, this method can be useful for allocation of the sub-channels into communication channels at the command center. In response to receiving the data blocks of transmission quality information, the command center may organize groups of unused ones of the plurality of sub-channels into respective ones of the communication channels as a function of the transmission quality data. The channels may further be assigned to newly deployed endpoints devices or reconfigured endpoint devices as needed.

Embodiments of the instant disclosure are also directed towards a system for assigning channels for communication between endpoint devices and one or more collector over power distribution lines. The system includes one or more collectors connected to the power distribution lines and configured to collect transmission quality data for a plurality of sub-channels used to form the communication channels. A command center is configured to receive the transmission quality data from the one or more collectors via a data network, and organize groups of unused ones of the plurality of sub-channels into respective ones of the communication channels based on the transmission quality data. Each communication channel having the same bandwidth includes a plurality of sub-channels. Communications channels are assigned to one or more endpoint devices. A channel reconfiguration command is transmitted to one or more collectors. The one or more collectors are configured to prompt the at least one endpoint device to use the assigned communication channel in response to the channel reconfiguration command.

The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description and in connection with the accompanying drawings, in which.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

A particular use of power line communications relates to utility meter reading applications. In utility meter reading applications (as well as other applications), there can be millions of endpoint devices providing coordinated readings. In order for endpoint devices to effectively communicate over the network, the endpoints must be configured to communicate using different upstream channels. Deployment and configuration of so many endpoints for coordinated communication represents a daunting task. Aspects of the present disclosure recognize that it is impractical to pre-configure endpoints at factory prior to deployment due to changing conditions and configuration of power distribution line networks. Transmission by an endpoint on one channel can also introduce noise on channels used by other endpoints and transmission quality of different channels can vary depending on the location in the network of the endpoint. In addition, power distribution networks may be reconfigured (e.g., switching endpoint devices between collectors) to balance load, resolve outages, etc, which can effect quality of a channel used by an endpoint device.

Even if accurate data could be gathered on the factory settings for every endpoint to be deployed in a power distribution network, such data is unreliable because the endpoint may be deployed in the field weeks or months before a collector is installed. For instance, endpoint devices may be deployed at different times, and reconfigured to use different communication channels after deployment to adapt to the conditions of the network. As a result, when a new endpoint is deployed, a factory assigned channel may already be in use by a reconfigured endpoint. Furthermore, initial data values (e.g., factory kWh, outage counters, etc.) may be out of date by the time a collector is deployed.

Aspects of the present disclosure are believed to be applicable to a variety of different types of devices and systems for deployment and configuration of endpoint devices in a network. While the present disclosure is not necessarily limited to such applications, various aspects of the invention may be appreciated through a discussion of various examples using this context.

One or more embodiments include systems and processes for allocating communication channels based on the conditions of sub-channels on the power distribution lines, and locating and assigning communication channels to endpoint devices. In one or more embodiments, a process is provided for the location and configuration of endpoint devices. A collector is configured to monitor unused frequency bands to determine transmission quality of the frequency bands. For ease of reference, frequency bands used for transmission may be referred to as sub-channels and such terms are used interchangeably herein. The quality of the sub-channels are transmitted to, and analyzed at, the command center to determine channel quality of various arrangements of the unused frequency bands that may be used as upstream communication channels by the endpoint devices. In certain embodiments, the channels assigned to each endpoint can be referred to as a channel block. The channel block can contain the sub-channels assigned to the endpoint. Although not necessarily limited thereto, the channel block can contain sub-channels that have contiguous frequencies with respect to each other, where the contiguous nature of the frequencies relates to the set of possible sub-channels.

After an endpoint device is deployed, the command center may select a satisfactory channel for the endpoint device, based on the determined channel quality ratings, and assign the selected channel to the endpoint device by sending a configuration command downstream, via a collector, to the endpoint device. In response to the configuration command, the endpoint device may be prompted to transmit an endpoint acknowledgement packet (e.g., a configuration packet that indicates/acknowledges receipt of the configuration command), configuration settings, and other current requested information upstream, via a collector, to the command center. In some embodiments the endpoint acknowledgement may also include configuration data including, e.g., firmware version, hardware model identification, service disconnect capability, current values of various data counters, configuration group, starting values for metrology data, etc. In this manner, deployed endpoints may be configured or reconfigured based on current conditions of the network.

In certain embodiments, a method is provided for the collection of transmission quality data of the sub-channels. A collector monitors a plurality of sub-channels on the power distribution lines, via operation at the collector, and measures one or more transmission quality indicators for each sub-channel (e.g., noise-floor, signal to power ratio, peak-to-average power ratio, etc.). To reduce space needed for transmission of the transmission quality data to the command center, one or more embodiments may quantize the data into an integer range of values. To further save space, some embodiments may partition the sub-channels into groups and format the quantized transmission quality data of each group into a respective data block having only one address associated with the corresponding sub-channels. In this manner, less transmission overhead is used for addressing the quantized transmission quality data value of the sub-channels.

In certain embodiments, a system is provided for dynamic assignment of channels for communication between endpoint devices and collectors over power distribution lines. The system includes one or more collectors configured to collect transmission quality data for a plurality of sub-channels. A command center is configured to receive the transmission quality data from the one or more collectors via a data network, and organize groups of unused ones of the plurality of sub-channels into respective ones of the communication channels based on the transmission quality data. The command center may be configured to assign the communication channels to endpoint devices, as needed, based on the transmission quality data. For instance, as new endpoint devices are deployed, the command center may assign channels having the best quality rating to the endpoint devices. The command center is configured to assign a channel to an endpoint device by issuing a find-endpoint command to one or more collectors. In response to the find-endpoint command, the one or more collectors are configured to broadcast a configuration request to the endpoint device that prompts the endpoint devices to use the assigned channel for upstream communication to the collector.

Consistent with various embodiments of the present disclosure, the power distribution lines can carry power that is provided from one or more generating stations (power plants) to residential and commercial customer sites alike. The generating station uses AC to transmit the power long distances over the power distribution lines. Long-distance transmission can be accomplished using a relatively high voltage. Substations located near the customer sites provide a step-down from the high voltage to a lower voltage (e.g., using transformers). Power distribution lines carry this lower voltage AC from the substations to the customer sites. Depending upon the distribution network, the exact voltages and AC frequencies can vary. For instance, voltages can generally be in the range 100-480 V (expressed as root-mean-square voltage) with two commonly used frequencies being 50 Hz and 60 Hz. In the United States, for example, a distribution network can provide customer sites with 120 V and/or 480 V, at 60 Hz.

Figure 1A:
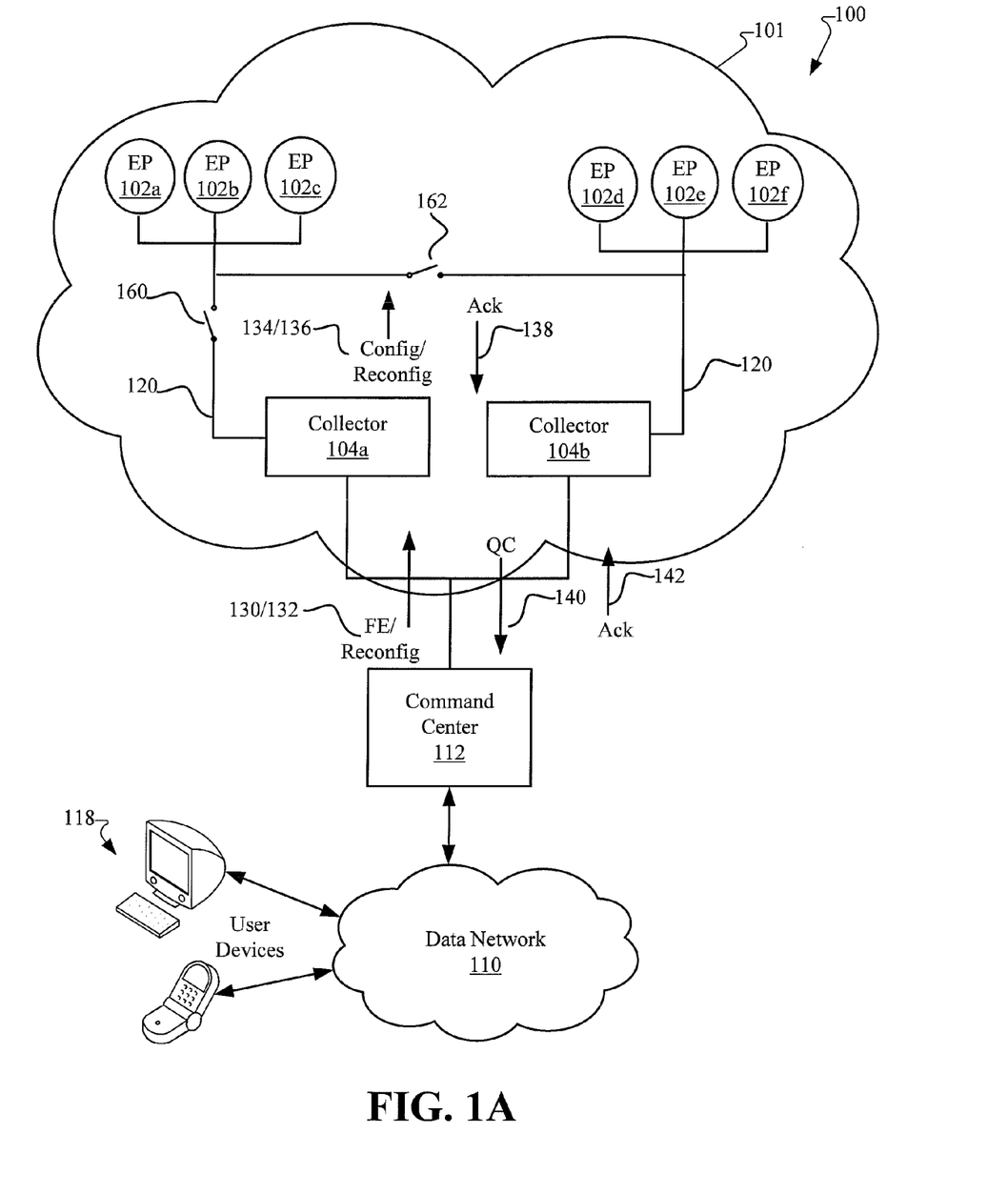
FIG. 1A is a block diagram of an example network environment having endpoints configured for transmission of data over a power distribution network, consistent with embodiments of the present disclosure.

FIG. 1A is a block diagram of an example power line communication (PLC) network environment 100 in which endpoints 102 communicate data with collector units, consistent with embodiments of the present disclosure. The network environment 100 includes a service network 101 in which a plurality of endpoint devices 102a-102f are coupled (e.g., communicatively coupled) to collector units 104a, 104b. Consistent with embodiments of the present disclosure, the endpoints 102 can provide data from utility meters. For instance, data can be provided from power meters, gas meters and/or water meters, which are respectively installed in gas and water distribution networks. For ease of description the embodiments and examples are primarily described with reference to endpoints 102 as providing utility data (e.g., power) metering over a power distribution network. However, the embodiments are not so limited and it is understood that other data can also be communicated by endpoint devices.

In FIG. 1A, endpoints 102a-102c and 102d-102f transmit data over power distribution lines to collector units 104a, 104b, respectively. The collector units 104 can include circuitry (e.g., including one or more data processors) that is configured and arranged to communicate with the endpoints over power distribution lines. The collector units 104 can also include circuitry for interfacing with a command center 112 at a local utility office or other location. The interface to the command center 112 can be implemented using a variety of different communication networks including, but not limited to, a wide-area network (WAN), local area network (LAN), the Internet, or any other communications network. The collectors may be installed in power stations, power substations, transformers, etc. to control bidirectional communication between the command center 112 (e.g., located at a utility office) and endpoints (e.g., located at metering locations for customer sites).

Endpoints may be configured to transmit data to collectors 104 using a number of different data modulation techniques, including frequency shift keying (FSK), phase shift keying (PSK, e.g., Quadrature PSK or 8PSK), multiple frequency shift keying (MFSK, e.g., 2 of 9, or 2 of 46 MFSK), Quadrature Amplitude Modulation (QAM, e.g., 16 or 256 QAM), etc. Encoded data symbols from a particular endpoint may be transmitted over one of thousands of communications channels in a PLC system. Communications channels may be allocated from various portions of spectrum over which data are transmitted. According to certain embodiments of the instant disclosure, the command center 112, collectors 104, and endpoints 102 are configured to dynamically allocate and assign channels to endpoint devices 102 as needed.

This configuration data and commands (e.g., 130, 132, and 140) are exchanged between the command center 112 and the collectors 104 to assess channel conditions and direct collectors 104 to configure endpoint devices (e.g., assign communication channels) on behalf of the command center 112. Likewise, configuration data and requests (e.g., 134, 136, 138, 142 are exchanged between the collectors 104 and the endpoint devices 102 over power distribution lines 120 to configure the endpoints as directed and gather configuration information and channel conditions for analysis by the command center.

Figure 1B:
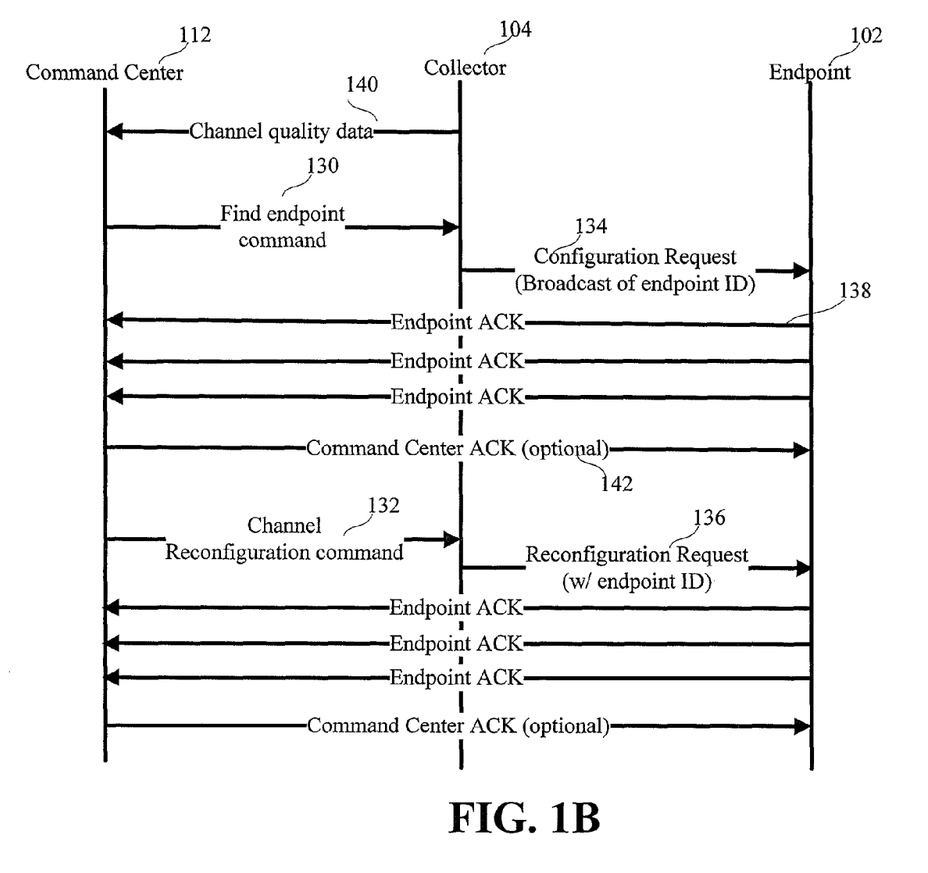
FIG. 1B shows a dataflow between a command center, a collector, and an endpoint in accordance with one or more embodiments.

For ease of explanation, messages exchanged between the command center 112, collectors 104, and endpoints 102 shown in FIG. 1A is discussed together with FIG. 1B which illustrates an example exchange of the messages. FIG. 1B shows the dataflow between a control center, a collector, and an endpoint shown in FIG. 1A, for configuration and reconfiguration of the endpoint.

As shown in FIG. 1B, each collector 104 collects transmission quality data (e.g., noise floor) for unused sub-channels. In a few, non-limiting, embodiments, the collection can be collector driven (e.g., using a periodic collection) or command center driven (e.g., using polling-driven messages). This transmission quality data may be referred to as quiet channel data (QC) and such terms may be used interchangeably herein. In some embodiments transmission quality data may also be collected to monitor quality of used channels assigned to the endpoint devices 102 (e.g., signal to noise ratio, peak-to-average power ratio, and/or other potential criteria). The channel quality data 140 is uploaded to the command center 112 periodically or in response to an event (e.g., time of day, locating an endpoint, power outage, etc.). Based on the quality of frequency bands used by the channels, the command center 112 allocates free bandwidth into communication channels that can be assigned to endpoints.

A find endpoint (FE) command 130 is transmitted from the command center 112 to a collector 104 over a communication network. In response, the collector 104 broadcasts a configuration request 134 indicating the ID of an endpoint to find. The endpoint 102, when deployed in the field, will scan the downstream channels from the collector 104, listening for a configuration request indicating an ID of the endpoint 102. If the endpoint receives a configuration request having the ID of the endpoint 102, the endpoint 102 begins transmitting an endpoint acknowledgement packet using an upstream channel indicated by the configuration request. The endpoint acknowledgement packet 138 is forwarded by the collector 104 to the command center as it is received.

The endpoint acknowledgement packet may contain different data depending on the implementation. As described above, in some embodiments, the endpoint acknowledgement packet may serve only to indicate to the collector that the endpoint has been located and is operating on the assigned channel. In some other embodiments, the endpoint acknowledgement packet may serve to provide configuration information about the endpoint device to the collector including, e.g., firmware version, hardware model identification, service disconnect capability, current values of various data counters, configuration group, starting values for metrology data, etc.

Depending on the quality of the channel and the location of the endpoint, the endpoint may have to transmit the endpoint acknowledgement packet 138 multiple times before it is received by the command center 112. When a first portion of the endpoint acknowledgement packet 138 is received, the endpoint is considered to be located. Depending on the bandwidth of the channel, transmission of the endpoint acknowledgement packet 138 may take several hours. When the complete endpoint acknowledgement packet is received by the command center 112, the endpoint is considered to be in a normal mode of operation. In this example, in response to receiving the full endpoint acknowledgement packet 138, a command center acknowledgement 142 is sent from the command center to the endpoint device 102, via the collector 104. The command center acknowledgement 142 serves to indicate to the endpoint that it may stop transmitting the endpoint acknowledgement 138.

In some embodiments, a command center acknowledgement 142 may not be transmitted. Rather, the configuration request 134 may indicate a number of times to transmit the endpoint acknowledgement 138. In some other embodiments, the configuration request 134 may indicate a number of times to retry transmission if no acknowledgement is received from the command center. These and other retransmission schemes are described in more detail with reference to FIG. 2 below.

In some situations, the command center 112 may decide to assign a different channel to the endpoint 102. For instance, if conditions of a channel assigned to the endpoint 102 deteriorate, the collector 104 may stop receiving data from the endpoint 102 or channel quality data may indicate other available channels have a better quality rating than the current channel. If the endpoint 102 is to be assigned a new channel, command center 112 sends a channel reconfiguration command 132 downstream to one of more collectors 104. In response, the collectors 104 transmit reconfiguration requests 136 downstream to the endpoints 102. The reconfiguration requests 136 indicate an ID of the endpoint to be reconfigured and the new channel that the endpoint is to use. Similar to the configuration request the endpoint is prompted to begin transmitting data using the newly assigned channel. In this example, the endpoint is illustrated as transmitting the endpoint acknowledgement packet 138 in response to the reconfiguration request 136. However, it is recognized that in some implementations, the endpoint device may transmit different information in response to configuration and reconfiguration requests 132 and 136.

Figure 2:
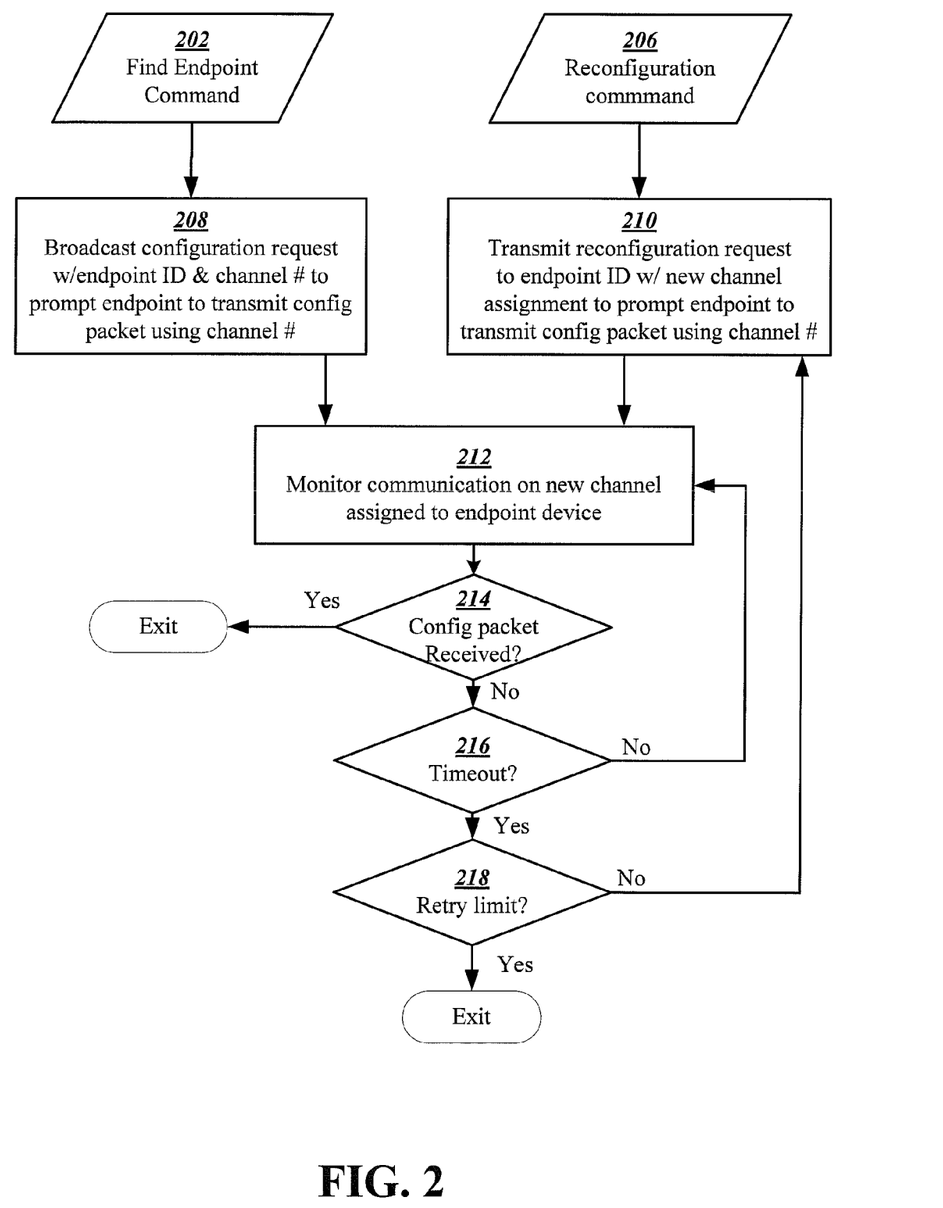
FIG. 2 shows a flowchart of a process performed by a collector for location or reconfiguration of endpoints.

FIG. 2 shows a flowchart of a process that may be performed by a collector location or reconfiguration of endpoint devices. When an endpoint is deployed, it is pre-configured to listen to a set of downstream channels, used by collectors, for configuration instructions. In response to receiving a find endpoint command 202 from the command center, the collector broadcasts a configuration request to the endpoint at block 208. The configuration request indicates an ID of the endpoint to be located and configured, and a channel that the endpoint is to use for communication. Similarly, in response to receiving a reconfiguration command 206 from the command center, the collector transmits a reconfiguration request to the endpoint at block 210. The reconfiguration request indicates the ID of the endpoint device and includes one or more reconfiguration instructions for the endpoint device. The reconfigure instructions may assign a new channel to the endpoint device or adjust one or more settings of the device.

As discussed above, the endpoint device may respond differently to configuration and reconfiguration requests. However, for ease of explanation, FIG. 2 is described with reference to an implementation in which both configuration and reconfiguration requests prompt the endpoint device to transmit an endpoint acknowledgement packet. The assigned channel is monitored at block 212 for acknowledgement from the endpoint. If the endpoint does not send back upstream data when expected, a set of retry algorithms is applied to resend the configuration/reconfiguration requests.

One or more embodiments implement retry algorithms in the command center. For instance, in one implementation, the command center may be configured to wait a configurable period of time (e.g., 8 hours) after the configuration/reconfiguration command is sent downstream before taking further action. After timeout has expired at decision block 216, the command center may prompt the collector to resend the configuration/reconfiguration request to the endpoint. In this example, the number of times a collector will attempt to resend the configuration/reconfiguration request is limited by a retry limit. If the retry limit is reached at decision block 218, no further attempts are made. However, this simple timeout algorithm has some potential problems when implemented by the command center. For instance, the collector may have an internal queue of commands to be sent downstream to endpoints. If the collector's queue becomes backed up for whatever reason, then the simple retry wait period may expire before the channel assignment command was even sent downstream. In one or more embodiments, the collectors are configured to periodically inform the command center what requests were sent downstream to endpoint, which endpoints the request were sent to, time cent, etc. This allows the command center to implement timeout and retry limits at the command center while avoiding the aforementioned problems.

In one or more other embodiments some retry logic can be implemented in the collectors. For instance, similar to the retry algorithms described with reference to FIG. 2, a collector may be configured to wait until a configurable amount of time has passed before taking further action. After timeout has expired, the collector may be configured to resend the configuration/reconfiguration request to the endpoint. Likewise, the collector may also implement a retry limit. The timeout and retry limits may be internal settings of the collector or may be specified by the find endpoint command issued by the command center.

Referring back to FIG. 1A, in certain embodiments, the command center 112 may provide an interface that allows user devices 118 access to data received by the command center 112 via data network 110. For example, the user devices 118 might be owned by utility provider operator, maintenance personnel and/or customers of the utility provider. For example, data identifying the increased power usage described above can be provided to a user device 118, which can, in turn, determine an appropriate action regarding the increased usage. When endpoints are deployed, the command center may be prompted by a user (e.g., via a user interface at the command center 112 or a user device 118 used by a technician) to locate and configure the endpoint.

In one or more embodiments, the command center can access data indicating an association between a subset of collectors and particular endpoint(s). The command center can then send a configuration request for the associated endpoint(s) to only those collectors in the subset. For instance, collectors that are co-located in a substation that provides power to particular end-user locations are associated to endpoints located at or near those end-user/customer locations. Particular embodiments provide an interface that allows an operator of the system to provide data indicating the associations between collectors and endpoints. The ability to target communications toward subsets of collectors can be particularly useful for alleviating data traffic at other collectors. It is recognized that the user may provide other information as well including various endpoint configuration settings including, e.g., data logging, service disconnect, counter values, reporting, etc. Additionally, in some embodiments, the command center 112 and/or user devices 118 may provide an interface to view historical channel quality data and allow the user to reconfigure endpoints via the interface.

User devices 118 may also provide limited access to utility customers. For instance, data identifying a time-of-use measure and/or a peak demand measure can be provided to the user device 118. Similarly, if there has been a power outage, the command center 112 can provide data to user devices 118 that are accessible by customers to provide information regarding the existence of the outage and potentially provide information estimating the duration of the outage.

As mentioned above, power distribution networks may be reconfigured to balance power loads, restore service after power outages, etc. One or more embodiments may entail reconfiguring a power distribution network using switching groups. Switching groups are groups of collectors, whose power distribution lines may be electrically isolated from the power distribution lines of other groups of collectors. Switches (e.g., 160 and 162) in the network of FIG. 1A can be configured to switch endpoints between collectors in that group, for example in a backfeed situation. Collectors in a switching group must have each endpoint in the group assigned to it on the same channel as every other collector has that endpoint. Assignment of channels to endpoints in switching groups must take switching group membership into account, look for common, unused channels among those collectors in a group, and assign the same channel to a given endpoint on all the collectors in the group. Assignment thus reserves the channel for the endpoint at all collectors in the group. In this manner, endpoints may be dynamically switched between collectors without having to relocate and reassign a new channel to the endpoint.

Channel quality data is analyzed at the command center to arrange the unused frequency bands into contiguous groups that may be used as communication channels by the endpoint devices. The number of sub-channels in each channel depends on the particular implementation and configuration of the network. In some implementation, different classes of endpoint devices may be allocated channels of different bandwidth. For instance, residential meters may be allocated communication channels having a bandwidth of 12 sub-channels and commercial meters may be allocated channels having a bandwidth of 92 sub-channels. For ease of explanation, the embodiments and examples are primarily described with reference to communication channels that each includes N sub-channels.

The unused sub-channels are arranged onto communication channels based on the determined quality of the sub-channels. For each resulting channel, an overall quality is determined (e.g., sum or average of noise floor of the sub-channels and/or other criteria), which can be used to assign channels to endpoint devices. For instance, the channels may be rated, based on the determined overall quality, and the channels having the best quality may be assigned to endpoints as needed.

If a collector is in a switching group (i.e., two or more isolated collectors), endpoint devices assigned to the switching group are configured to communicate using the same channel for any of the collectors to which the endpoint device may be connected. Because the same channel is used by the endpoint device for communication with each collector in the switching group, an overall quality rating may be determined that reflects the quality of channel for the entire switching group. For instance, a quality rating of a channel for a switching group may be the sum or average of the quality ratings of the channel quality rating for all of the collectors in the switching group. For ease of explanation, channel allocation and assignment is primarily described herein with reference to a single collector.

The unused sub-channels may be arranged onto communication channels using a number of different algorithms to construct and assign data channels based on quality ratings of the sub-channels. One or more embodiments implement a max packing scheme to arrange unused sub-channels into communication channels. The max packing scheme organizes the sub-channels so that as many channels are created from the unused sub-channel space as possible. This may be accomplished by starting at one end a block of continuous sub-channels and arranging every 12 contiguous blocks in the group into channels. This eliminates fragmentation issues, at the possible cost of reduced channel quality.

Figure 3:
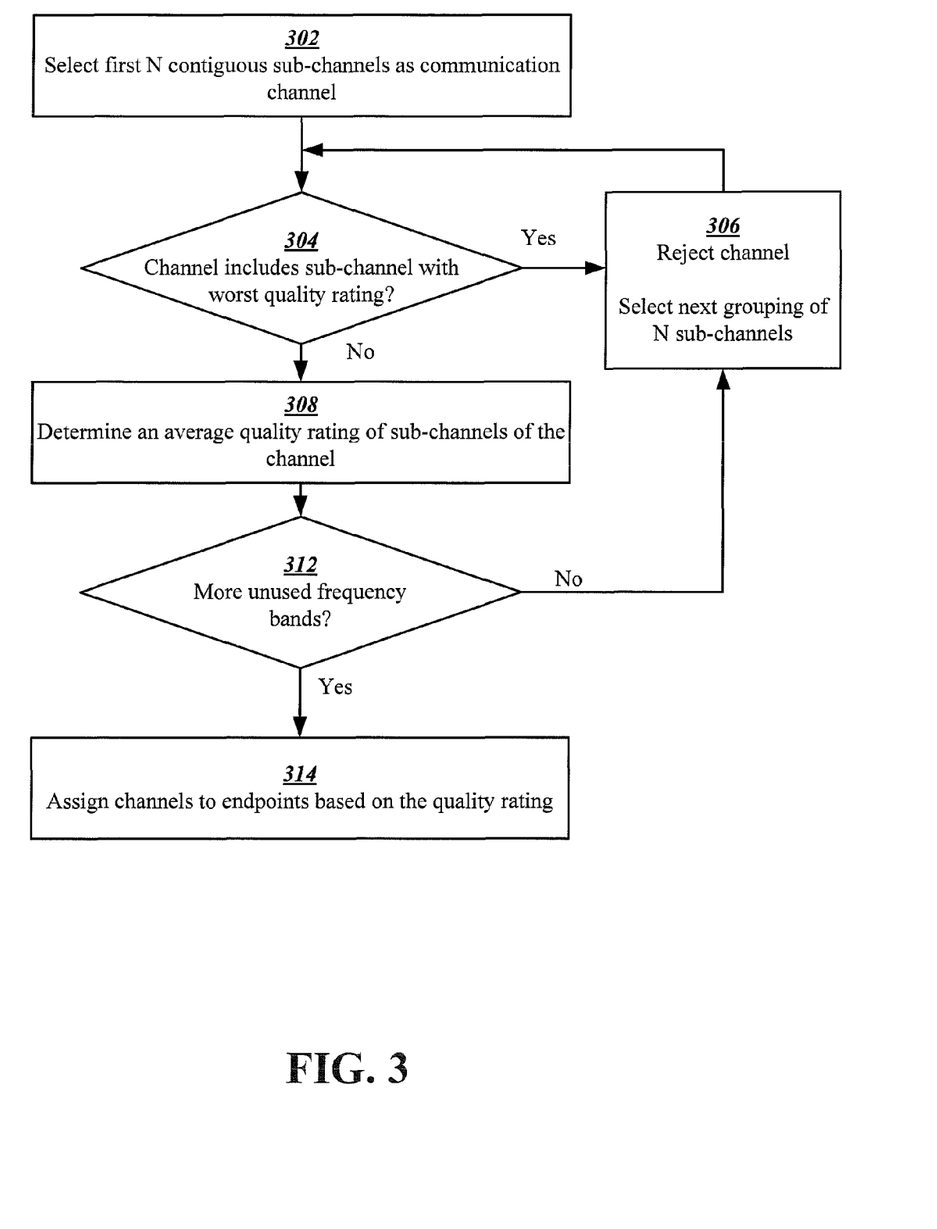
FIG. 3 shows a flowchart of a process performed by a command center for channel allocation.

FIG. 3 shows a flowchart of a process for channel allocation at the command center using the max packing scheme. The channel allocation is performed as a function of quality rating data of the sub-channels that is received from the collectors. In some embodiments, allocation may be performed using the current quality rating data. In some other embodiments, the channel allocation may be performed using multiple quality rating values from multiple time periods. For example, the channel allocation may be performed as a function of a 30-day average of quality rating data of each sub-channel. Use of the 30-day average is particularly useful to evaluate long-term performance of the sub-channels. Due to the potentially large number of sub-channels and switching groups, retention of historical data may require a large number of storage and processing resources. The 30-day average reduces memory and processing requirements while providing an indicator of long-term performance of the individual sub-channels.

The first N contiguous sub-channels (N being the number of sub-channels included in each channel) are selected as a channel at block 302. If the selected group of sub-channels includes a sub-channel with worst quality rating (e.g., sub-channel is in use by another endpoint) at decision block 304, the channel is rejected and the next contiguous group of sub-channels is selected for analysis at block 306. For instance, if the group is rejected, the next contiguous group may begin at the next unused sub-channel following the sub-channel having the lowest quality rating. However, in some other implementations, the next group of sub-channels may begin at the next sub-channel following the current group. This may help to simplify processing for switching groups, where analysis of each channel is performed for multiple collectors.

If the channel is not rejected at decision block 304, a quality rating of the channel is determined at block 308. The quality rating of the channel may be computed, e.g., as an average or a sum of the quality ratings of the sub-channels. If there are further unused sub-channels to analyze at decision block 312, the next group of N contiguous sub-channels is selected at block 306. The next group of sub-channels begins at the first unused channel following the previously analyzed channel. Thus, the analyzed channels do not overlap. The process is repeated until the all unused sub-channels have been analyzed. The channels may be assigned to endpoints as needed based on the quality rating at block 314.

One or more embodiments implement a comprehensive allocation scheme to arrange unused sub-channels into communication channels. The comprehensive scheme analyzes every possible contiguous grouping of N sub-channels of the unused sub-channels to determine a channel quality rating. This scheme allows the channels with the highest possible quality rating to be available for assignment to endpoint devices at the cost of increased fragmentation of channel space.

Figure 4:
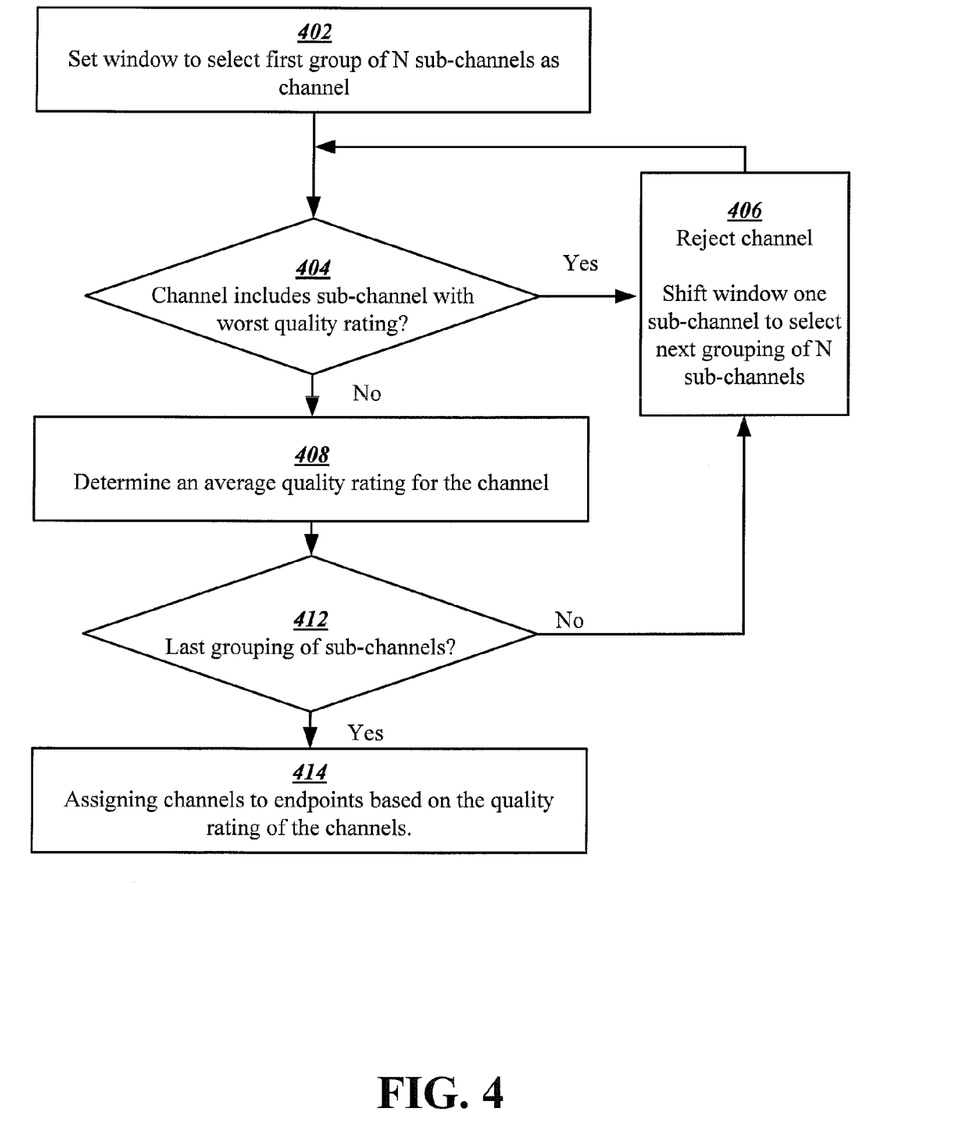
FIG. 4 shows a flowchart of another process performed by a command center for channel allocation.

FIG. 4 shows a flowchart of a process for channel allocation at the command center using the comprehensive allocation scheme. As described with reference to FIG. 3, the channel allocation is performed as a function of quality rating data of the sub-channels that is received from the collectors. In some embodiments, allocation may be performed using the current quality rating data. In other embodiments, the channel allocation may be performed as a function of several quality ratings for each sub-channel over a time period. For instance, a running average can be taken of the quality ratings for each sub-channel over several (e.g., 30 days). The time period can be adjusted according to factors such as how quickly the allocation scheme responds to changes in the quality rating. For instance, changing too quickly (using a short time period) may result in not selecting otherwise good sub-channels in response to a temporary noise source. Changing too slowly (using a long time period) may result in selection of sub-channels that are no longer usable due to changes in the line (e.g., due to old quality ratings skewing the analysis). Consistent with particular embodiments of the present disclosure, the individual quality rating over the time period need not be stored. For instance, a running average can be stored and updated for each sub-channel during a time period. This running average can be stored in place of individual quality ratings for the time period and used to generate the average. The running average can be reset and/or replaced by another average after the time period completes. This can be particularly useful for database management in complex systems with many sub-channels and endpoints. Certain embodiments can use schemes other than simple averaging. As a non-limiting example, an exponential moving average can be used by applying more weight to recent quality scores.

The comprehensive allocation scheme may be implemented, e.g., by selecting contiguous groups of sub-channels in unused channel space using a sliding window of size N. The window is set to select the first N contiguous sub-channels as a channel at block 402. If the selected group of sub-channels includes a sub-channel with worst quality rating (e.g., sub-channel is in use by another channel) at decision block 404, the channel is rejected and the window is shifted one sub-channel to select the next contiguous group of sub-channels for analysis at block 406. Otherwise, a quality rating of the channel is determined at block 408. As described with reference to FIG. 3, the quality rating of the channel may be computed, e.g., as an average or a sum of the quality ratings of the sub-channels. If there are further groups of sub-channels to analyze at decision block 412, the window is shifted one sub-channel to select the next contiguous group of sub-channels for analysis at block 406. The process is repeated until each contiguous grouping of the unused sub-channels has been analyzed. The channels may be assigned to endpoints as needed based on the quality rating at block 414.

For embodiments in which channels may have different bandwidth for different endpoint devices (e.g., 12 sub-channels for residential endpoints and 92 sub-channels for commercial endpoints), the above channel allocation processes may be repeated for each of the channel bandwidths.

As described above, collectors in the system periodically or continuously monitor unused sub-channels to determine a quality rating of the sub-channel for communication. The collector sends this data back via an automatic event to the command center. However, instead of passing the raw noise floor data for up to all sub-channels, one or more embodiments filter and encode the sub-channel quality data to reduce the amount of data that must be transmitted to the command center.

In one or more embodiments, a float noise floor value of a sub-channel that is measured by a collector is quantized into a discrete integer value (e.g., a 4-bit value 0-15). The quantization does not interfere with the channel allocation described with reference to FIGS. 3 and 4 because the allocation processes only need a relative comparison of the quality of the sub-channels. In some embodiments, the collector further formats the quantized values for contiguous blocks of the sub-channels that are only addressed by the first sub-channel of the block. This is done to optimize the byte-packing in the payload of the transmitted data, for example, if the collector only returned quality information for used channels. The data would have to specify each sub-channel address for each value. By formatting the data to remove sub-channel addresses for all but the first sub-channel in each group, less overhead is used.

Figure 5:
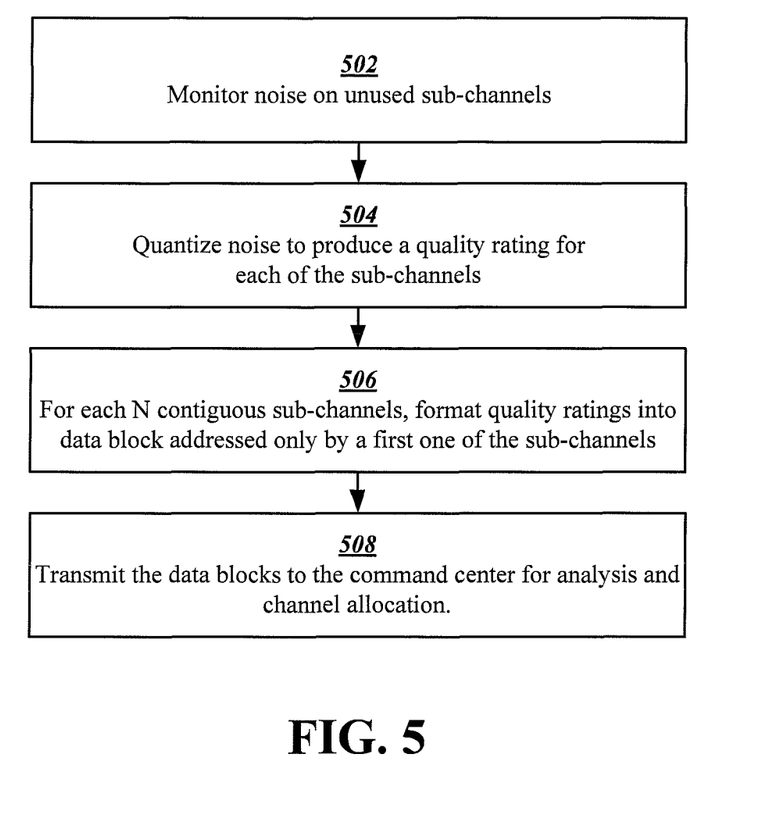
FIG. 5 shows a flowchart of a process for determining and transmitting data regarding quality of channels to the command center.

FIG. 5 shows a flowchart of a process for determining a quality rating of sub-channels at a collector and transmitting the quality rating data to the command center. Noise is monitored on unused sub-channels at block 502. A quality rating is quantized, as described above, to produce a quality rating for each sub-channels at 504. Used sub-channels may be assigned the worst quality rating to prevent the sub-channels from being reallocated by the command center. Quality ratings of each group of N contiguous sub-channels are formatted into data blocks addressed only by the first one of the sub-channels at block 506. The data blocks are transmitted to the command center for analysis and channel allocation at block 508.

The signals and associated logic and functionality described in connection with the figures can be implemented in a number of different manners. Unless otherwise indicated, various general-purpose systems and/or logic circuitry may be used with programs in accordance with the teachings herein, or it may prove convenient to use a more specialized apparatus to perform the disclosed aspects. For example, according to the present disclosure, one or more of the methods can be implemented in hard-wired circuitry by programming a general-purpose processor, other fully or semi-programmable logic circuitry, and/or by a combination of such hardware and a general-purpose processor configured with software. Accordingly, the various components and processes shown in the figures can be implemented in a variety of circuit-based forms, such as through the use of data processing circuit modules.

It is recognized that aspects of the disclosure can be practiced with computer/processor-based system configurations other than those expressly described herein. The required structure for a variety of these systems and circuits would be apparent from the intended application and the above description.

The various terms and techniques are used by those knowledgeable in the art to describe aspects relating to one or more of communications, protocols, applications, implementations, and mechanisms. One such technique is the description of an implementation of a technique expressed in terms of an algorithm or mathematical expression. While such techniques may be implemented, for example, by executing code on a computer, the expression of that technique may be conveyed and communicated as a formula, algorithm, or mathematical expression.

For example, a block denoting "C=A+B" as an additive function implemented in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions are stored for execution in a manner consistent with one or more of the methods of the present disclosure. The instructions can be used to cause a general-purpose or special-purpose processor that is programmed with the instructions to perform the steps of the methods. The steps may be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions, which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration and should not be construed to necessarily limit the invention. Based on the above discussion and illustrations, those skilled in the art will readily recognize that various modifications and changes may be made to the present invention without strictly following the exemplary embodiments and applications illustrated and described herein. For instance, such changes may include variations on the mechanisms for sensing the output current. Such modifications and changes do not depart from the true spirit and scope of the present invention, including aspects set forth in the following claims.

What is claimed is:

1. A method for assigning communication channels for communication between endpoint devices and one or more collectors over power distribution lines carrying alternating current (AC) power, the method comprising:
    at the one or more collectors, collecting transmission quality data for a plurality of sub-channels;
    communicating the transmission quality data from the one or more collectors to a command center; and
    at the command center:
        based on the transmission quality data, organizing unused ones of the plurality of sub-channels into respective ones of the communication channels, each communication channel having the same number of contiguous sub-channels that includes at least two sub-channels,
        assigning one or more endpoint devices to respective ones of the communications channels; and
        transmitting a first command to at least one of the one or more collectors;
        in response to the at least one collector receiving the first command, transmitting data from the collector over the power distribution lines to configure at least one of the one or more endpoint devices to use a corresponding respective one of the communication channels allocated to the at least one of the one or more endpoint devices.

2. The method of claim 1, wherein
the plurality of sub-channels subdivide a limited bandwidth; and
the organizing unused ones of the plurality of sub-channels into respective ones of the communication channels includes dividing the unused ones of the plurality of sub-channels into contiguous groups of contiguous sub-channels.

3. The method of claim 1, wherein
each of the communication channels includes N sub-channels; and
the organizing unused ones of the plurality of sub-channels into respective ones of the communication channels includes determining a transmission quality value for each grouping of N contiguous sub-channels in the plurality of sub-channels.

4. The method of claim 3, wherein determining an average transmission quality value for each grouping of N contiguous sub-channels includes calculating the transmission quality using a sliding window of size N across the plurality of sub-channels.

5. The method of claim 1, wherein:
different endpoint devices exhibit different transmission characteristics for different communication channels; and
the assigning one or more of the endpoint devices respective ones of the communications channels is performed as a function of a transmission quality of sub-channels and performance of the end point devices.

6. The method of claim 1, wherein:
the organizing the unused ones of the plurality of sub-channels into the respective ones of the communication channels is further based on multiple transmission quality values corresponding to different time periods, for of each of the plurality of sub-channels.

7. The method of claim 1, wherein:
the one or more endpoint devices includes, an endpoint device included in a switching group of collectors; and
assigning the one or more endpoint devices to respective ones of the communications channels includes, for the endpoint device in the switching group:
    determining one or more channels of the respective ones of communication channels that are indicated as unused by each of collectors in the switching group;
    for each of the one or more channels across the collectors, determining an overall quality rating of the channel for the collectors in the switching group as a whole; and
    assigning the endpoint device in the switching group, for each collector in the switching group, the channel of the one of more channels that has the best of the overall quality ratings.

8. The method of claim 1, wherein collecting transmission quality data for the plurality of sub-channels includes:
    monitoring data transmitted by endpoint devices on the plurality of sub-channels using the one or more collectors;
    determining a quantized transmission quality value for each of the plurality of sub-channels;
    partitioning the plurality of sub-channels into groups of contiguous sub-channels;
    formatting the determined transmission quality values corresponding to each group of contiguous sub-channels into a respective data block having only one address associated with the corresponding sub-channels; and
    for each group of contiguous sub-channels, transmitting the respective the data block to the command center.

9. The method of claim 1, wherein organizing the unused ones of the plurality of sub-channels, at the command center, includes grouping the unused ones of the plurality of sub-channels into groups of contiguous sub-channels.

10. The method of claim 1, wherein the first command is a find endpoint command indicating an identification (ID) for an endpoint to find, further comprising
in response to the at least one of the one or more collectors receiving the find endpoint command from the command center, broadcasting a configuration command from the one or more collectors, over the power distribution lines, the configuration command configured to prompt an endpoint device having the ID to transmit a response using a selected one of the communication channels.

11. The method of claim 10, wherein the selected one of the communication channels is indicated by the find endpoint command.

12. The method of claim 10, wherein the configuration command is configured to prompt the endpoint device having the ID to repeat transmission of the response until an acknowledgement (ACK) packet is received by the endpoint device having the ID.

13. The method of claim 10, wherein:
the configuration command indicates a retry limit value; and
the endpoint is configured and arranged to repeat transmission of the response if the response is unacknowledged by the one or more collectors and transmission has not been repeated a number of times greater than the retry limit.

14. A method for monitoring communication channels used for communication between endpoint devices and one or more collectors over power distribution lines carrying alternating current (AC) power distribution lines communication network, the method comprising:
at the one or more collectors:
monitoring a plurality of sub-channels of the communication channels on the power distribution lines;
determining a quantized transmission quality value for each of the plurality of sub-channels;
partitioning the plurality of sub-channels into groups of contiguous sub-channels;
formatting the determined quantized transmission quality values corresponding to each group of contiguous sub-channels into a respective data block having only one address associated the corresponding sub-channels; and
for each group of contiguous sub-channels, transmitting respective the data block to a command center.

15. The method of claim 14, further comprising:
in response to the command center receiving the data blocks corresponding to the contiguous groups of sub-channels, organizing groups of unused ones of the plurality of sub-channels into respective ones of the communication channels based on transmission quality data, each communication channel having the same number of contiguous sub-channels.

16. The method of claim 15, further comprising in response to a user command indicating an identification (ID) of an endpoint device to find:
assigning one of the respective ones of the communication channels to the endpoint device;
transmitting a find-endpoint command to one or more collectors indicating the ID and the assigned one of the respective ones of the communication channels; and
at each of the one or more collectors, in response to receiving the find endpoint command from the command center, broadcasting a configuration command over the power distribution lines, the configuration command configured to prompt an endpoint device having the ID to transmit a response using the assigned one of the respective ones of the communication channels.

17. The method of claim 16, wherein:
the user command indicates a subset of a plurality of collectors that are physically located near the endpoint; and
the transmitting the find-endpoint command to one or more collectors only transmits the find-endpoint command to collectors in the subset.

18. The method of claim 16, wherein the configuration command is configured to prompt the endpoint device having the ID to repeat transmission of the response until an acknowledgement (ACK) packet is received by the endpoint device having the ID.

19. The method of claim 16, wherein:
the configuration command indicates a retry limit value; and
the endpoint is configured and arranged to repeat transmission of the response if the response is unacknowledged by the one or more collectors and transmission has not been repeated a number of times greater than the retry limit.

20. The method of claim 15, wherein
the plurality of sub-channels subdivide a limited bandwidth; and
the organizing groups of the plurality of sub-channels into the respective ones of the communication channels includes dividing the plurality of sub-channels into contiguous groups of contiguous sub-channels.

21. The method of claim 15, wherein
each of the communication channels includes N sub-channels; and
the organizing groups of the plurality of sub-channels into the respective ones of the communication channels includes determining an average transmission quality value for each grouping of N contiguous sub-channels in the plurality of sub-channels.

22. A system for assigning communication channels for communication between endpoint devices and one or more collector over power distribution lines carrying alternating current (AC) power, the system comprising:
one or more collectors connected to the power distribution lines and configured and arranged to collect transmission quality data for a plurality of sub-channels used by the communication channels; and
a command center, configured and arranged to:
receive the transmission quality data from the one or more collectors via a data network;
organize groups of unused ones of the plurality of sub-channels into respective ones of the communication channels based on the transmission quality data, each communication channel having the same number of contiguous sub-channels,
assign one or more endpoint devices respective ones of the communications channels; and
transmit a channel configuration command to one or more collectors, the one or more collectors being configured, in response to the channel configuration command, to configure the at least one of the one or more endpoint devices to use the respective communication channel assigned to the endpoint device.

* * * * *